(12) United States Patent
Fujihara et al.

(10) Patent No.: US 7,416,813 B2
(45) Date of Patent: Aug. 26, 2008

(54) LITHIUM SECONDARY BATTERY

(75) Inventors: Toyoki Fujihara, Kobe (JP); Kazuhisa Takeda, Kobe (JP); Hideki Kitao, Kobe (JP); Takaaki Ikemachi, Kobe (JP); Toshiyuki Nouma, Kobe (JP); Naoya Nakanishi, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 554 days.

(21) Appl. No.: 11/066,225

(22) Filed: Feb. 25, 2005

(65) Prior Publication Data
US 2005/0191553 A1    Sep. 1, 2005

(30) Foreign Application Priority Data
Feb. 27, 2004  (JP) ............................. 2004-053672
Jan. 12, 2005  (JP) ............................. 2005-004851

(51) Int. Cl.
*H01M 4/58* (2006.01)
(52) U.S. Cl. .................. 429/231.1; 429/223; 429/224; 429/188; 429/323; 429/338
(58) Field of Classification Search ............. 429/231.1, 429/223, 224, 188, 323, 338
See application file for complete search history.

(56) References Cited

U.S. PATENT DOCUMENTS

| | | | |
|---|---|---|---|
| 6,506,516 B1 | 1/2003 | Wietelmann et al. | |
| 6,808,848 B2 | 10/2004 | Nakanishi et al. | |
| 7,172,834 B1* | 2/2007 | Jow et al. | 429/188 |
| 2005/0214646 A1* | 9/2005 | Kubota | 429/231.95 |

FOREIGN PATENT DOCUMENTS

| | | |
|---|---|---|
| CN | 1345101 A | 4/2002 |
| JP | 3066126 | 5/2000 |
| WO | WO 03/075371 A2 | 9/2003 |

OTHER PUBLICATIONS

Amine et al."Improved lithium manganese oxide spinel/graphite Li-ion cells for high-powder applications", Journal of Power Sources 129 *2004, pp. 14-19.*
Kang Xu et al., "LiBOB as Salt for Lithium-Ion Batteries", Electro-chemical and Solid-State Letters, 5(1) A26-A29 (2002).
Hideki Kitao et al., "Study on High-temperature Storage Performance of Lithium-ion . . . ", The script collection of the 43rd battery discussion, pp. 162-163, Oct. 12, 2002.
Hideki Kitao et al., "Study on High-temperature Performance of Lithium-ion . . . ", The script collection of the 44th battery discussion, pp. 308-309, Nov. 4, 2003.
Kang Xu et al., "Lithium Bis (oxalato) borate Stabilizes . . . ", Electromechanical and Solid-State Letters, 5 (11) A259-A262 (2002).
Kang, Xu et al., "Chemical Analysis of Graphite/Electrolyte Interface . . . ", Electromechanical and Solid-State Letters, 6 (7) A144-A148 (2003).
Hiroaki Kaneko et al., "Power Capability Improvement of LiBOB/PC . . . ", Abs. 65, IMLB 12 Meeting, The Electromechanical Society, Inc. (2004).

* cited by examiner

*Primary Examiner*—Laura S Weiner
(74) *Attorney, Agent, or Firm*—Westerman, Hattori, Daniels & Adrian, LLP.

(57) ABSTRACT

A lithium secondary battery is provided with a positive electrode, a negative electrode, and a non-aqueous electrolyte prepared by dissolving a solute in a non-aqueous solvent wherein a positive electrode active material of said positive electrode is composed of lithium-manganese composite oxide having a spinel structure and lithium-transition metal composite oxide having a layer structure containing at least nickel and lithium salt having oxalato complex as anion is admixed to said non-aqueous electrolyte.

10 Claims, 1 Drawing Sheet

Fig. 1

LITHIUM SECONDARY BATTERY

RELATED APPLICATION

The priority applications Numbers Japanese Patent Applications 2004-53672 and 2005-4851 upon which this application is based are hereby incorporated by reference.

BACKGROUND OF THE INVENTION

1. Field of the Invention

The present invention relates generally to a lithium secondary battery provided with a positive electrode, a negative electrode, and a non-aqueous electrolyte prepared by dissolving a solute in a non-aqueous solvent, and is characterized in that deterioration of a variety of characteristics is suppressed ensuring a sufficient battery capacity and a sufficient battery voltage even under high temperature conditions.

2. Description of the Related Art

Recently, as one of advanced secondary batteries featuring high power and high energy density, lithium secondary batteries of high electromotive force, using a non-aqueous electrolyte prepared by dissolving a solute in a non-aqueous solvent and utilizing oxidation and reduction of lithium have come into practical use.

In such lithium secondary batteries, lithium-manganese composite oxide having a spinel structure, lithium-cobalt composite oxide and lithium-nickel composite oxide having a layer structure and so on are generally used as a positive electrode active material of a positive electrode.

In the lithium secondary battery, when the lithium-manganese composite oxide having the spinel structure is used as the positive electrode active material, battery voltage is higher compared with a case where the lithium-cobalt composit oxide having the layer structure is used, however, there have remained problems that battery capacity is small and preservation characteristics at high temperature conditions are degraded.

On the other hand, in the lithium secondary battery using the lithium-nickel composite oxide having the layer structure as the positive electrode active material, the battery capacity is large, but the battery voltage is low and the preservation characteristics at high temperature are not improved sufficiently.

Therefore, in recent years, there has been proposed to use a mixture of the lithium-manganese composite oxide having the spinel structure and the lithium-nickel composite oxide having the layer structure as the positive electrode active material of the positive electrode, to appropriately set a balance between the battery capacity and the battery voltage and to improve the preservation characteristics at high temperature (see, the script collection of the 43rd battery discussion, pp. 162-163 and the script collection of the 44th battery discussion, pp. 308-309).

Unfortunately, however, the lithium secondary battery using such a mixture of the lithium-manganese composite oxide having the spinel structure and the lithium-nickel composite oxide having the layer structure as the positive electrode active material has not fully suppressed the deterioration of battery characteristics such as charge/discharge characteristics in storage under high temperature conditions.

Further, in such a lithium secondary battery, the non-aqueous electrolyte wherein a lithium salt, such as $LiPF_6$ or $LiBF_4$ is dissolved in the non-aqueous solvent such as ethylene carbonate, propylene carbonate or dimethyl carbonate is used.

Unfortunately, however, such a lithium secondary battery using the non-aqueous electrolyte wherein the lithium salt, such as $LiPF_6$ or $LiBF_4$ is dissolved in the non-aqueous solvent, such as ethylene carbonate, propylene carbonate or dimethyl carbonate has problems that the battery capacity is decreased and a battery internal resistance is increased in the storage under the high temperature conditions.

Therefore, in recent years, for the purpose of suppressing an increase in the battery internal resistance in the storage, there has been proposed to use the non-aqueous electrolyte wherein a main solvent is the ethylene carbonate and vinylene carbonate is admixed in the range of 0.01 to 10.0 wt % based on the ethylene carbonate (see, Japanese Patent No. 3066126).

Unfortunately, however, even using the non-aqueous electrolyte wherein the vinylene carbonate is admixed in the aforesaid range based on the ethylene carbonate, the increase in the battery internal resistance has not been fully suppressed in the storage under the high temperature conditions.

Additionally, in recent years, there has been proposed to use lithium bis(oxalato)borate as the solute in the non-aqueous electrolyte in order to improve cycle performance of the lithium secondary battery under the high temperature conditions (see, Kang Xu, Shengshui Zhang, Bruce A. Poese, and T. Richard Jow; "Lithium Bis(oxalato)borate Stabilizes Graphite Anode in Propylene Carbonate"; Electrochemical and Solid-State Letters, 5(11)A259-A262(2002)).

Unfortunately, however, even in a case where the lithium bis(oxalato)borate is used as the solute in the non-aqueous electrolyte of the lithium secondary battery, there has remained the problems that the battery internal resistance is increased and the battery characteristics such as the charge/discharge characteristics are deteriorated.

SUMMARY OF THE INVENTION

An object of the present invention is, in a lithium secondary battery provided with a positive electrode, a negative electrode, and a non-aqueous electrolyte prepared by dissolving a solute in a non-aqueous solvent, to improve the non-aqueous electrolyte in order to suppress an increase in a battery internal resistance and deterioration of battery characteristics such as charge/discharge characteristics in storage under high temperature conditions.

Another object of the present invention is, in the lithium second battery using a mixture of lithium-manganese composite oxide having a spinel structure and lithium-nickel composite oxide having a layer structure as a positive electrode active material of the positive electrode ensuring a sufficient battery capacity and a sufficient battery voltage, to suppress the increase in the battery internal resistance and the deterioration of the battery characteristics such as the charge/discharge characteristics in the storage under high temperature conditions.

A first lithium secondary battery of the present invention is provided with a positive electrode, a negative electrode and a non-aqueous electrolyte prepared by dissolving a solute in a non-aqueous solvent, wherein a positive electrode active material of the positive electrode is composed of lithium-manganese composite oxide having a spinel structure and lithium-transition metal composite oxide having a layer structure containing at least nickel, and lithium salt having an oxalato complex as anion is admixed to the non-aqueous electrolyte.

As the first lithium secondary battery, when the mixture of the lithium-manganese composite oxide having the spinel structure and the lithium-transition metal composite oxide having the layer structure containing at least nickel are used as the positive electrode active material, a potential of the lithium-manganese composite oxide having the spinel structure with high voltage is lowered by the lithium-nickel composite oxide having the layer structure with low voltage while the potential of the lithium-nickel composite oxide having the layer structure with low voltage is raised by the lithium-manganese composite oxide having the spinel structure with high voltage. As a result, the positive electrode active material is placed in a different energy condition from a case in which each of lithium-manganese composite oxide and the lithium-nickel composite oxide is present alone, thus preservation characteristics at high temperature of the lithium secondary battery under the high temperature conditions are conceivably improved.

Further, as the first lithium secondary battery, when the lithium salt having the oxalato complex as the anion is admixed, in addition to the solute, to the non-aqueous electrolyte prepared by dissolving the solute in the non-aqueous solvent, a stable surface film is formed on the surface of the negative electrode by the lithium salt having the oxalato complex as the anion even under the high temperature conditions. Therefore, even under the high temperature conditions, a side reaction generated by a direct contact between the negative electrode and the non-aqueous electrolyte is suppressed by the surface film. As a result, the preservation characteristics at high temperature of the lithium secondary battery are conceivably improved.

A second lithium secondary battery of the present invention is provided with a positive electrode, a negative electrode and a non-aqueous electrolyte prepared by dissolving a solute in a non-aqueous solvent and admixing lithium salt having an oxalato complex as anion and at least one film forming agent selected from a group consisting of vinylene carbonate, vinyl ethylene carbonate, ethylene sulfite, and fluoroethylene carbonate thereto.

In the second lithium secondary battery, the lithium salt having the oxalato complex as the anion and at least one film forming agent selected from the group consisting of vinylene carbonate, vinyl ethylene carbonate, ethylene sulfite, fluoroethylene carbonate to be admixed to the non-aqueous electrolyte prepared by dissolving the solute in the non-aqueous solvent are different from each other in a reduction decomposition electric potential. Therefore, when the lithium salt having the oxalato complex as the anion and the film forming agent are admixed to the non-aqueous electrolyte, in an initial charge time, the lithium salt having the oxalato complex as the anion is decomposed first and a stable first surface film even under the high temperature conditions is formed on the surface of the negative electrode and then the film forming agent is decomposed and a second surface film is formed over the first surface film.

Subsequently, the interaction between the first surface film and the second surface film makes themselves strong, so that the generation of the side reaction by the direct contact between the negative electrode and the non-aqueous electrolyte is prevented even under the high temperature conditions and the preservation characteristics at high temperature is improved while fully suppressing the increase in the battery internal resistance and the deterioration of the battery characteristics such as charge/discharge characteristics even in the storage under high temperature conditions.

These and other objects, advantages and features of the invention will become apparent from the following description thereof taken in conjunction with the accompanying drawing which illustrates specific embodiment of the invention.

DESCRIPTION OF THE PREFERRED EMBODIMENTS

Hereinafter, preferred embodiments of lithium secondary batteries according to the present invention will specifically be described. It is to be noted that the lithium secondary batteries according to the present invention should not be limited to the following examples thereof and suitable changes and modifications may be made thereto within the scope of the invention.

In a first lithium secondary battery and a second lithium secondary battery according to the present invention, as the non-aqueous solvent in the non-aqueous electrolyte solution, it is possible to use known non-aqueous solvent generally used in the lithium secondary batteries. Examples of the usable non-aqueous solvent include cyclic carbonate, such as ethylene carbonate, propylene carbonate and butylene carbonate, and chained carbonate, such as dimethyl carbonate, ethyl methyl carbonate and diethyl carbonate. Especially, a combination solvent of the cyclic carbonate and the chained carbonate is preferably used.

Further, as the solute in the non-aqueous electrolyte solution, it is possible to use known solute generally used in the lithium secondary batteries. Examples of the usable solute include $LiPF_6$, $LiAsF_6$, $LiBF_4$, $LiCF_3SO_3$, $LiN(C_lF_{2l+1}SO_2)(C_mF_{2m+1}SO_2)$ (wherein 1 and m denote an integer not less than 1), $LiC(C_pF_{2p+1}SO_2)(C_qF_{2q+1}SO_2)(C_rF_{2r+1}SO_2)$ (wherein p, q, and r denote an integer not less than 1), and these solute may be used alone or in combination of two or more. In particular, it is preferred to use $LiPF_6$ in combination of the lithium salt having the oxalato complex as the anion.

In the first lithium secondary battery and the second lithium secondary battery, in admixing the lithium salt having the oxalato complex as the anion as above, when an amount of the lithium salt having the oxalato complex as the anion is insufficient, the stable surface film even under high temperature conditions is not fully formed on the surface of the positive electrode and the negative electrode. On the other hand, when the amount of the lithium salt is excessive, a thick surface film is formed on the surface of the positive electrode and the negative electrode, thereby causing an increase in an internal resistance in the lithium secondary battery. In view of the above, the amount of the lithium salt having the oxalato complex as the anion to be admixed to the non-aqueous electrolyte solution is set in a range of 0.001 to 0.5 mol/l, preferably in 0.01 to 0.3 mol/l, and more preferably in 0.01 to 0.1 mol/l based on the non-aqueous solvent.

The lithium salt having the oxalato complex as the anion is a lithium salt having anion wherein a central atom having $C_2O_4^{2-}$ is arranged as a ligand, and for example, the lithium salt represented by a formula $Li[M(C_2O_4)_xR_y]$ (wherein M denotes an element selected from among a transition metal and groups IIIb, IVb and Vb in the periodic table, R denotes a group selected from halogen, an alkyl group and a halogen-substituted alkyl group, x denotes a positive integer and y denotes zero or the positive integer) may be used. Further, it is preferable to use the lithium salt wherein the above M is boron or phosphorus, for example, $Li[B(C_2O_4)_2]$, $Li[B(C_2O_4)F_2]$, $Li[P(C_2O_4)F_4]$, $Li[P(C_2O_4)_2F_2]$. Especially, $Li[B(C_2O_4)_2]$ is more preferably used.

Further, as the second lithium secondary battery, in admixing at least one film forming agent selected from the group consisting of vinylene carbonate, vinyl ethylene carbonate, ethylene sulfite, and fluoroethylene carbonate to the non-aqueous electrolyte solution, it is preferable to use vinylene carbonate in order to obtain the stable surface film under high temperature conditions.

Further, in admixing vinylene carbonate, when the additive amount of vinylene carbonate is insufficient, the second surface film formed by vinylene carbonate is not fully formed over the first surface film formed by the lithium salt having the oxalato complex as the anion. On the other hand, when the additive amount of vinylene carbonate is excessive, the second surface film is formed thick over the first surface film, thereby causing the increase in the internal resistance in the lithium secondary battery. In view of the above, the amount of vinylene carbonate to be admixed to the non-aqueous electrolyte solution is set in a range of 0.1 to 5.0 wt %, preferably in 0.5 to 3.0 wt %, and more preferably in 1.0 to 2.0 wt % based on the non-aqueous electrolyte solution before admixing the lithium salt having the oxalato complex as the anion thereto.

In the second lithium secondary battery, as the positive electrode active material of the positive electrode, it is possible to use known positive electrode active material generally used in the lithium secondary battery. Preferably, the lithium-manganese composite oxide having the spinel structure is used for the purpose of obtaining high battery voltage and the lithium-transition metal composite oxide having the layer structure containing at least nickel is used for the purpose of obtaining large battery capacity. More preferably, a mixture of the lithium-manganese composite oxide having the spinel structure and the lithium-transition metal composite oxide having the layer structure containing at least nickel is used as in the first lithium secondary battery.

In addition, the lithium-manganese composite oxide used as the positive electrode active material may further contain at least one element selected from B, F, Mg, Al, Ti, Cr, V, Fe, Co, Ni, Cu, Zn, Nb and Zr.

Further, it is preferable that the lithium-transition metal composite oxide having the layer structure containing at least nickel used as the positive electrode active material contains manganese in order that a structural stability of the lithium secondary battery is risen, resulting in obtaining the lithium secondary battery with improved safety under the high temperature conditions. Furthermore, for the purpose of improving high-rate characteristics of the lithium secondary battery, it is more preferable that the lithium-transition metal composite oxide further contains cobalt. Specifically, the lithium-transition metal composite oxide having the layer structure containing at least nickel which is represented by a formula $Li[Li_aMn_xNi_yCO_zM_b]O_2$ (wherein M denotes at least one element selected from B, F, Mg, Al, Ti, Cr, V, Fe, Cu, Zn, Nb, Y, Zr and Sn, and a, b, x, y and z satisfy a relationship $0 \leq a \leq 0.3$, $b \geq 0$, $a+b+x+y+z=1$, $x \leq 0$, $y > 0$ and $z \leq 0$) is preferably used.

In a case where a mixture of the lithium-manganese composite oxide having the spinel structure and the lithium-transition metal composite oxide having the layer structure containing at least nickel is used, when one is too much, results as mentioned above can not be attained causing difficulty in improving the preservation characteristics at high temperature. Therefore, a mixture ratio of the lithium-manganese composite oxide having the spinel structure and the lithium-transition metal composite oxide having the layer structure containing at least nickel is set in the range of 9:1 to 1:9, preferably 6:4 to 1:9, more preferably 4:6 to 1:9 by weight.

In the first lithium secondary battery and the second lithium secondary battery, a negative electrode active material of the negative electrode is not particularly limited. It is possible to use known negative electrode active material generally used in the lithium secondary batteries, but it is preferable to use a carbon material, and in particular, it is preferable to use graphite material.

The following examples specifically illustrate lithium secondary batteries according to the present invention. Further, comparative examples will be taken to make it clear that each lithium secondary battery according to the examples is capable of suppressing deterioration of characteristics in storage under high temperature conditions.

EXAMPLE 1

Figure 1:
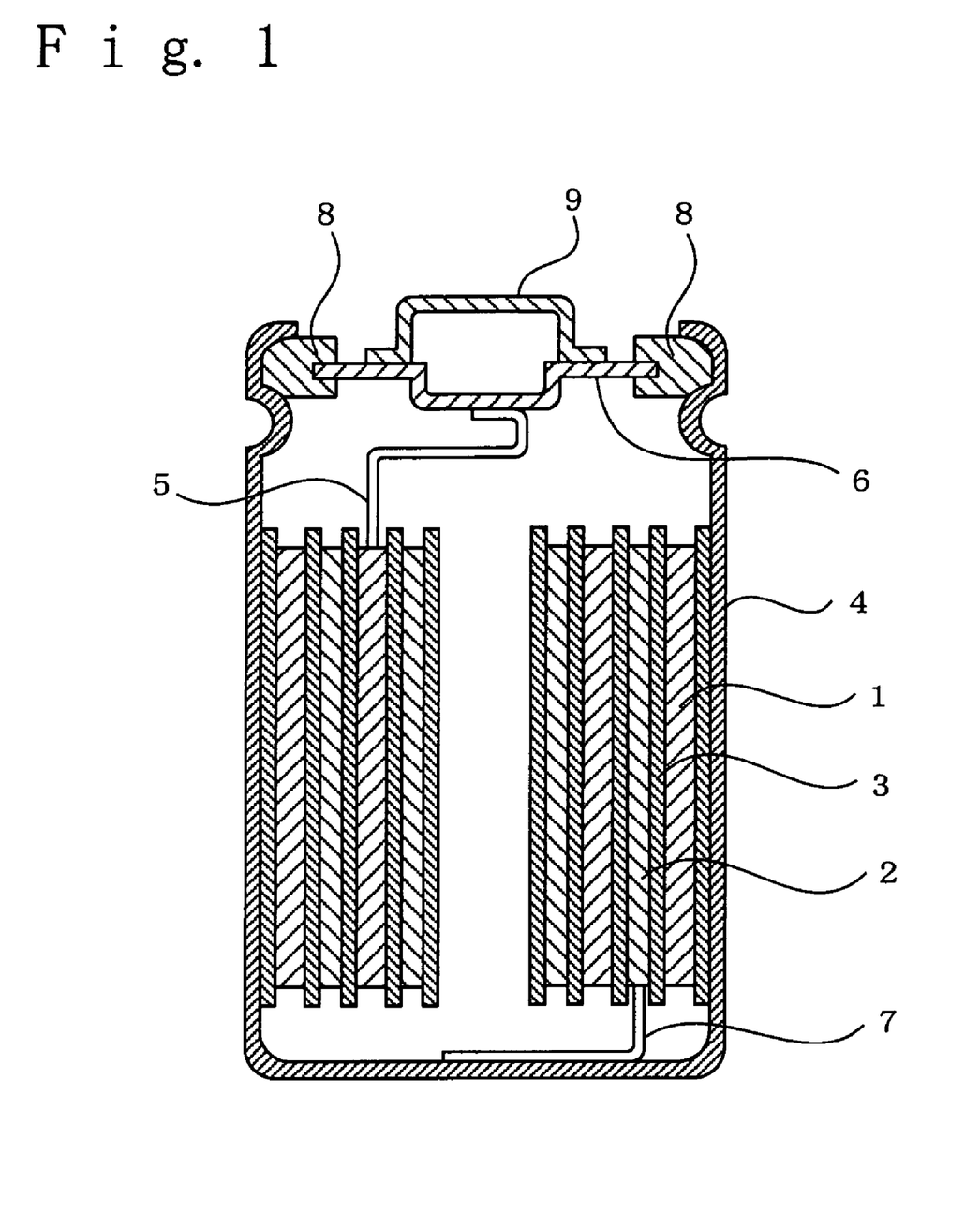
FIG. 1 is a schematic sectional view of a lithium secondary battery according to Examples and Comparative Examples of the present invention.

In Example 1, there were used a positive electrode, a negative electrode, and a non-aqueous electrolyte solution prepared in the following manners so as to fabricate a cylindrical lithium secondary battery as shown in FIG. 1 having a size of 18650 and a rated capacity of 1.4 Ah.

Preparation of Positive Electrode

In the preparation of the positive electrode, lithium-manganese composite oxide having a spinel structure represented by a general formula $Li_{1.1}Mn_{1.9}O_4$ and lithium-nickel-cobalt-manganese composite oxide having a layer structure represented by the general formula $LiNi_{0.4}CO_{0.3}Mn_{0.3}O_2$ were mixed in a weight ratio of 3:7 to obtain a positive electrode active material.

The positive electrode active material, carbon as a conductive agent, and polyvinylidene fluoride as a binding agent were weighted out in a weight ratio of 90:5:5. The positive electrode material and the carbon were kneaded with a solution having the polyvinylidene fluoride dissolved in N-methyl-2-pyrolidone to adjust slurry. Next, the slurry was applied to both sides of a current collector of aluminum foil, dried and rolled by a rolling roller to obtain the positive electrode.

Preparation of Negative Electrode

In the preparation of the negative electrode, graphite powder was used as a negative electrode active material. The graphite powder, styrene-butadiene rubber as a binding agent and carboxymethyl cellulose as a viscosity improver were weighted out in a weight ratio of 98:1:1. The graphite powder and styrene-butadiene rubber were kneaded with an aqueous solution of carboxymethyl cellulose to adjust slurry. Next, the slurry was applied to both sides of a current collector of copper foil, dried and rolled by a rolling roller to obtain a negative electrode.

Preparation of Non-aqueous Electrolyte Solution

In the preparation of the non-aqueous electrolyte solution, ethylene carbonate which is a cyclic carbonate and ethyl methyl carbonate which is a chain carbonate were mixed in a volume ratio of 3:7 to prepare a mixed solvent, in which $LiPF_6$ was dissolved in a concentration of 1 mol/l as a solute, and in which lithium bis(oxalato)bolate $Li[B(C_2O_4)_2]$ was admixed in a concentration of 0.01 mol/l and vinylene carbonate (VC) was further admixed in a weight ratio of 1.0 wt % based on a weight of the non-aqueous electrolyte solution before admixing the lithium bis(oxalato)bolate $Li[B(C_2O_4)_2]$ thereto.

Fabrication of Battery

In the fabrication of a battery, as shown in FIG. 1, a separator 3 formed of a lithium-ion-transmittable porous polyethylene film was interposed between the positive electrode 1 and the negative electrode 2 prepared in the above-mentioned manners, and they were contained in a battery can 4 upon being spirally wound after which the non-aqueous electrolyte solution prepared in the above-mentioned manner was poured in the battery can 4 and the battery can 4 was sealed, and the positive electrode 1 was connected to an external terminal 9 attached to a positive-electrode cover 6 through a positive-electrode lead 5 and the negative electrode 2 was connected to the battery can 4 through a negative-electrode lead 7, to electrically separate the battery can 4 and the positive electrode cover 6 from each other by an insulating packing 8.

EXAMPLES 2 AND 3

In Examples 2 and 3, in the preparation of the non-aqueous electrolyte solution of Example 1, the concentration of lithium bis(oxalato)bolate Li[B $(C_2O_4)$ 2] to be admixed to the aforesaid mixed solvent was changed. Except for the above, the same procedure as that in the Example 1 was used to fabricate each of a lithium secondary battery of Examples 2 and 3.

The concentration of lithium bis(oxalato)bolate Li[B $(C_2O_4)_2$] to be admixed to the mixed solvent was respectively set to 0.05 mol/l in Example 2, and 0.10 mol/l in Example 3.

COMPARATIVE EXAMPLE 1

In Comparative Example 1, in the preparation of the non-aqueous electrolyte solution of Example 1, the lithium bis (oxalato)bolate Li[B$(C_2O_4)_2$] was not admixed to the mixed solvent. Except for the above, the same procedure as that in Example 1 was used to fabricate a lithium secondary battery of Comparative Example 1

EXAMPLE 4

In Example 4, in the preparation of the positive electrode of Example 1, only the lithium-nickel-cobalt-manganese composite oxide having the layer structure represented by the general formula $LiNi_{0.4}CO_{0.3}Mn_{0.3}O_2$ was used as the positive electrode active material and the lithium-manganese composite oxide having the spinel structure represented by the general formula $Li_{1.1}Mn_{1.9}O_4$ was not used. Further, in the preparation of the non-aqueous electrolyte solution of Example 1, $LiPF_6$ as the solute was dissolved in a concentration of 0.50 mol/l and lithium bis (oxalato)bolate Li[B $(C_2O_4)_2$] was admixed to the mixed solvent in a concentration of 0.50 mol/l. Except for the above, the same procedure as that in Example 1 was used to fabricate a lithium secondary battery of Example 4.

COMPARATIVE EXAMPLE 2

In Comparative Example 2, in the preparation of the positive electrode of Example 1, only the lithium-nickel-cobalt-manganese composite oxide having the layer structure represented by the general formula $LiNi_{0.4}CO_{0.3}Mn_{0.3}O_2$ was used as the positive electrode active material and the lithium-manganese composite oxide having the spinel structure represented by the general formula $Li_{1.1}Mn_{1.9}O_4$ was not used in the same manner as Example 4. Further, in the preparation of the non-aqueous electrolyte solution of Example 1, the lithium bis(oxalato)bolate Li[B$(C_2O_4)_2$] was not admixed to the mixed solvent. Except for the above, the same procedure as that in Example 1 was used to fabricate a lithium secondary battery of Comparative Example 2.

COMPARATIVE EXAMPLE 3

In Comparative Example 3, in the preparation of the positive electrode of Example 1, only the lithium-nickel-cobalt-manganese composite oxide having the layer structure represented by the general formula $LiNi_{0.4}CO_{0.3}Mn_{0.3}O_2$ was used as the positive electrode active material and the lithium-manganese composite oxide having the spinel structure represented by the general formula $Li_{1.1}Mn_{1.9}O_4$ was not used in the same manner as Example 4. Further, in the preparation of the non-aqueous electrolyte solution of Example 1, $LiPF_6$ as the solute was not dissolved and only the lithium bis(oxalato) bolate Li[B $(C_2O_4)$ 2] was admixed to the mixed solvent in a concentration of 1.0 mol/l. Except for the above, the same procedure as that in Example 1 was used to fabricate a lithium secondary battery of Comparative Example 3.

Each of the lithium secondary batteries of Examples 1 to 4 and Comparative Examples 1 to 3 thus fabricated was charged at a charging current of 1.4 A to a voltage of 4.2 V. Then, each of the lithium secondary batteries was further charged at the charging current of 0.07 A while the charging current was decreased keeping the voltage of 4.2 V, and then was discharged at a discharging current of 0.47 A to the voltage of 3.0 V under the room temperature of 25° C. so as to measure a discharge capacity Qo before storage.

Then, under the room temperature of 25° C., each of the lithium secondary batteries of Examples 1 to 4 and Comparative Examples 1 to 3 was charged at the charging current of 1.4 A until state of charge (SOC) became 50%, and then, was charged and discharged at the charging currents of 0.24 A, 0.70 A, 2.4 A and 4.2 A respectively for ten seconds, thus, each of battery voltages were measured. Each of the currents and the battery voltages measured as above were plotted to find a straight line showing I-V characteristics at a charge time and a discharge time, and an IV resistance (mΩ) at the charge time and the discharge time before the storage was found based on a slop of the found straight line. The results were shown in the following Table 1.

Each of the lithium secondary batteries of Examples 1 to 4 and Comparative Examples 1 to 3 was charged at the charging current of 1.4 A until the state of charge (SOC) became 50% under the room temperature of 25° C., and was stored in a homeothermal container in which the temperature was 65° C. for 10 days.

After being stored in the homeothermal container in which the temperature was 65° C. for 10 days, each of the lithium secondary batteries of Examples 1 to 4 and Comparative Examples 1 to 3 was taken out the container so as to measure a discharge capacity $Q_{10}$ after the storage for 10 days and the IV resistance (mΩ) at the charge time and the discharge time after the storage for 10 days in the same manner as above.

Next, a percentage of capacity recovery ratio (%) in each of the lithium secondary batteries of Examples 1 to 4 and Comparative Examples 1 to 3 was found based on the discharge capacity Qo before the storage and the discharge capacity $Q_{10}$ after the storage for 10 days by way of the following formula. In addition, an increment of IV resistance (mΩ) at the charge time and the discharge time after the storage for 10 days was found based on the IV resistance (mΩ) at the charge time and the discharge time before the storage and the IV resistance (mΩ) at the charge time and the discharge time after the storage for 10 days. The results were shown in the following Table 1.

Percentage of capacity recovery ratio (%)=$(Q_{10}/Q_o) \times 100$

TABLE 1

| | positive electrode active material | LiPF$_6$ (mol/l) | Li[B(C$_2$O$_4$)$_2$] (mol/l) | VC (wt %) | IV resistance before storage (mΩ) at charge time | IV resistance before storage (mΩ) at discharge time | after storage for 10 days at 65° C. capacity recovery ratio (%) | after storage for 10 days at 65° C. increment of IV resistance (mΩ) at charge time | after storage for 10 days at 65° C. increment of IV resistance (mΩ) at discharge time |
|---|---|---|---|---|---|---|---|---|---|
| Example 1 | Li$_{1.1}$Mn$_{1.9}$O$_4$ LiNi$_{0.4}$Co$_{0.3}$Mn$_{0.3}$O$_2$ | 1.0 | 0.01 | 1.0 | 67.4 | 63.3 | 95.8 | 0.5 | 1.0 |
| Example 2 | Li$_{1.1}$Mn$_{1.9}$O$_4$ LiNi$_{0.4}$Co$_{0.3}$Mn$_{0.3}$O$_2$ | 1.0 | 0.05 | 1.0 | 69.4 | 65.0 | 95.2 | 0 | 0 |
| Example 3 | Li$_{1.1}$Mn$_{1.9}$O$_4$ LiNi$_{0.4}$Co$_{0.3}$Mn$_{0.3}$O$_2$ | 1.0 | 0.10 | 1.0 | 76.2 | 71.0 | 96.2 | 0.7 | 1.0 |
| Comparative Example 1 | Li$_{1.1}$Mn$_{1.9}$O$_4$ LiNi$_{0.4}$Co$_{0.3}$Mn$_{0.3}$O$_2$ | 1.0 | 0 | 1.0 | 66.9 | 63.1 | 97.1 | 1.0 | 1.7 |
| Example 4 | LiNi$_{0.4}$Co$_{0.3}$Mn$_{0.3}$O$_2$ | 0.50 | 0.50 | 1.0 | 81.7 | 78.7 | 88.4 | 0.1 | 0 |
| Comparative Example 2 | LiNi$_{0.4}$Co$_{0.3}$Mn$_{0.3}$O$_2$ | 1.0 | 0 | 1.0 | 69.6 | 66.5 | 88.8 | 1.7 | 1.6 |
| Comparative Example 3 | LiNi$_{0.4}$Co$_{0.3}$Mn$_{0.3}$O$_2$ | 0 | 1.0 | 1.0 | 84.9 | 82.8 | 92.6 | 8.6 | 7.9 |

Each of the lithium secondary batteries of Examples 1 to 3 and Comparative Example 1 was charged at the charging current of 1.4 A until the state of charge (SOC) became 50% under the room temperature of 25° C., and was stored in the homeothermal container in which the temperature was 65° C. for 30 days.

Next, a discharge capacity Q$_{30}$ after the storage for 30 days and the IV resistance (mΩ) at the charge time and the discharge time after the storage for 30 days were found in the same manner as above. Further, in the same manner as above, the percentage of capacity recovery ratio (%) after the storage for 30 days and the increment of IV resistance (mΩ) at the charge time and the discharge time after the storage for 30 days were found. The results were shown in the following Table 2.

ture represented by the general formula Li$_{1.1}$Mn$_{1.9}$O$_4$ and the non-aqueous electrolyte solution which was prepared by admixing, in addition to LiPF$_6$ as the solute, the lithium bis (oxalato)bolate Li[B(C$_2$O$_4$)$_2$] to the non-aqueous solvent, as compared with the lithium secondary battery of Comparative Example 1 using the non-aqueous electrolyte solution in which the lithium bis(oxalato)bolate Li[B(C$_2$O$_4$)$_2$] was not admixed to the non-aqueous solvent while using the same positive electrode active material of the lithium secondary batteries of Examples 1 to 3. The results indicate, in the lithium secondary batteries of Examples 1 to 3, deterioration of the charge/discharge characteristics after the storage under high temperature conditions was suppressed. In particular, the deterioration of the charge/discharge characteristics at a high rate was decreased.

TABLE 2

| | positive electrode active material | LiPF$_6$ (mol/l) | Li[B(C$_2$O$_4$)$_2$] (mol/l) | VC (wt %) | IV resistance before storage (mΩ) at charge time | IV resistance before storage (mΩ) at discharge time | after storage for 30 days at 65° C. capacity recovery ratio (%) | after storage for 30 days at 65° C. increment of IV resistance (mΩ) at charge time | after storage for 30 days at 65° C. increment of IV resistance (mΩ) at discharge time |
|---|---|---|---|---|---|---|---|---|---|
| Example 1 | Li$_{1.1}$Mn$_{1.9}$O$_4$ LiNi$_{0.4}$Co$_{0.3}$Mn$_{0.3}$O$_2$ | 1.0 | 0.01 | 1.0 | 67.4 | 63.3 | 92.0 | 4.8 | 6.3 |
| Example 2 | Li$_{1.1}$Mn$_{1.9}$O$_4$ LiNi$_{0.4}$Co$_{0.3}$Mn$_{0.3}$O$_2$ | 1.0 | 0.05 | 1.0 | 69.4 | 65.0 | 92.7 | 0.5 | 0.9 |
| Example 3 | Li$_{1.1}$Mn$_{1.9}$O$_4$ LiNi$_{0.4}$Co$_{0.3}$Mn$_{0.3}$O$_2$ | 1.0 | 0.10 | 1.0 | 76.2 | 71.0 | 92.0 | 1.0 | 1.8 |
| Comparative Example 1 | Li$_{1.1}$Mn$_{1.9}$O$_4$ LiNi$_{0.4}$Co$_{0.3}$Mn$_{0.3}$O$_2$ | 1.0 | 0 | 1.0 | 66.9 | 63.1 | 91.8 | 7.1 | 8.2 |

As shown in the results, the increment of the IV resistance after the storage under the high temperature conditions was further suppressed in the lithium secondary batteries of Examples 1 to 3 using the positive electrode active material which was prepared by mixing the lithium-nickel-cobalt-manganese composite oxide having the layer structure represented by the general formula LiNi$_{0.4}$CO$_{0.3}$Mn$_{0.3}$O$_2$ and the lithium-manganese composite oxide having the spinel struc- According to a comparison among the lithium secondary batteries of Examples 1 to 3, when the amount of the lithium bis(oxalato)bolate Li[B(C$_2$O$_4$)$_2$] to be admixed to the non-aqueous solvent is insufficient, the increment of the IV resistance after the storage under the high temperature conditions for a long time tends to increase. On the other hand, when the amount is excessive, the IV resistance tends to increase before the storage under high temperature conditions. Therefore, the amount of the lithium bis(oxalato)bolate Li[B (C$_2$O$_4$)$_2$] to be admixed to the non-aqueous solvent was preferably set in the concentration of 0.01 to 0.10 mol/l. In particular, in the lithium secondary battery of Example 2 wherein the amount was set in the concentration of 0.05 mol/l, the IV resistance before the storage under the high temperature conditions was low and the increment of the IV resistance after the storage under the high temperature conditions for a long time was decreased.

According to a comparison among the lithium secondary batteries of Example 4 and Comparative Examples 2 and 3 wherein only the lithium-nickel-cobalt-manganese composite oxide having the layer structure represented by the general formula LiNi$_{0.4}$CO$_{0.3}$Mn$_{0.3}$O$_2$ was used as the positive electrode active material and the lithium-manganese composite oxide having the spinel structure represented by a general formula Li$_{1.1}$Mn$_{1.9}$O$_4$ was not used, the increment of the IV resistance after the storage under the high temperature conditions in the lithium secondary battery of Example 4 using the non-aqueous electrolyte solution which was prepared by admixing, in addition to LiPF$_6$ as the solute, the lithium bis(oxalato)bolate Li[B(C$_2$O$_4$)$_2$] to the non-aqueous solvent was further suppressed, as compared with the lithium secondary battery of Comparative Example 2 using the non-aqueous electrolyte solution wherein the lithium bis(oxalato)bolate Li[B (C$_2$O$_4$)$_2$] was not admixed and the lithium secondary battery of Comparative Example 3 wherein LiPF$_6$ the solute was not dissolved in the non-aqueous solvent.

According to a comparison among the lithium secondary batteries of Example 1 to 4, each of the lithium secondary batteries of Examples 1 to 3 using the mixture of the lithium-nickel-cobalt-manganese composite oxide having the layer structure represented by the general formula LiNi$_{0.4}$CO$_{0.3}$Mn$_{0.3}$O$_2$ and the lithium-manganese composite oxide having the spinel structure represented by the general formula Li$_{1.1}$Mn$_{1.9}$O$_4$ as the positive electrode active material presented a lower IV resistance before the storage under the high temperature conditions and a higher capacity recovery ratio after the storage under the high temperature conditions while preventing the decrease of the battery capacity in the storage under the high temperature conditions, as compared with the lithium secondary battery of Example 4 wherein only the lithium-nickel-cobalt-manganese composite oxide having the layer structure represented by the general formula LiNi$_{0.4}$CO$_{0.3}$Mn$_{0.3}$O$_2$ was used as the positive electrode active material.

EXAMPLE 5

In Example 5, in the preparation of the non-aqueous electrolyte solution, the ethylene carbonate which is the cyclic carbonate and the ethyl methyl carbonate which is the chain carbonate were mixed in the volume ratio of 3:7 to prepare the mixed solvent, in which LiPF$_6$ as the solute was dissolved in the concentration of 1 and in which the lithium bis(oxalato)bolate Li[B (C$_2$O$_4$)$_2$] was admixed in the concentration of 0.05 mol/l and the vinylene carbonate (VC) was further admixed in the weight ratio of 2.0 wt % based on a weight of the non-aqueous electrolyte solution before admixing the lithium bis(oxalato)bolate Li[B (C$_2$O$_4$)$_2$] thereto. Except for the above, the same procedure as that in Example 1 was used to fabricate a lithium secondary battery of Example 5.

EXAMPLE 6

In Example 6, in the preparation of the non-aqueous electrolyte solution of Example 5, the lithium bis(oxalato)bolate Li[B (C$_2$O$_4$)$_2$] was admixed to the mixed solvent in the concentration of 0.10 mol/l. Except for the above, the same procedure as that in Examples 1 and 5 was used to fabricate a lithium secondary battery of Example 6.

EXAMPLE 7

In Example 7, in the preparation of the non-aqueous electrolyte solution of Example 5, the vinylene carbonate (VC) was not admixed. Except for the above, the same procedure as that in Examples 1 and 5 was used to fabricate a lithium secondary battery of Example 7.

EXAMPLE 8

In Example 8, in the preparation of the non-aqueous electrolyte solution of Example 5, the lithium bis(oxalato)bolate Li[B (C$_2$O$_4$)2] was admixed to the mixed solvent in the concentration of 0.10 mol/l while the vinylene carbonate (VC) was not admixed thereto. Except for the above, the same procedure as that in Examples 1 and 5 was used to fabricate a lithium secondary battery of Example 8.

COMPARATIVE EXAMPLE 4

In Comparative Example 4, in the preparation of the non-aqueous electrolyte solution of Example 5, the lithium bis(oxalato)bolate Li[B(C$_2$O$_4$)$_2$] was not admixed. Except for the above, the same procedure as that in Examples 1 and 5 was used to fabricate a lithium secondary battery of Comparative Example 4.

COMPARATIVE EXAMPLE 5

In Comparative Example 5, in the preparation of a non-aqueous electrolyte solution, neither the lithium bis(oxalato)bolate Li[B (C$_2$O$_4$)$_2$] nor the vinylene carbonate (VC) was not admixed. Except for the above, the same procedure as that in Examples 1 and 5 was used to fabricate a lithium secondary battery of Comparative Example 5.

EXAMPLE 9

In Example 9, in the preparation of the positive electrode of Example 1, LiCoO$_2$ was used as the positive electrode active material, and in the preparation of the non-aqueous electrolyte solution of Example 5, an additive weight ratio of the vinylene carbonate (VC) was changed to 1.0 wt % based on the weight of the non-aqueous electrolyte solution before admixing the lithium bis(oxalato)bolate Li[B (C$_2$O$_4$)$_2$] thereto. Except for the above, the same procedure as that in Examples 1 and 5 was used to fabricate a lithium secondary battery of Example 9.

COMPARATIVE EXAMPLE 6

In Comparative Example 6, in the preparation of the positive electrode of Example 1, LiCoO$_2$ was used as the positive electrode active material in the same way as Example 9, and in the preparation of the non-aqueous electrolyte solution of Example 5, the lithium bis(oxalato)bolate Li[B(C$_2$O$_4$)$_2$] was not admixed while the additive amount of the vinylene carbonate (VC) was changed to 1.0 wt % based on the weight of the non-aqueous electrolyte solution before admixing the lithium bis(oxalato)bolate Li[B (C$_2$O$_4$)$_2$] thereto. Except for the above, the same procedure as that in Examples 1 and 5 was used to fabricate a lithium secondary battery of Comparative Example 6.

EXAMPLE 10

In Example 10, in the preparation of the positive electrode of Example 1, lithium-nickel-cobalt-manganese composite oxide having a layer structure represented by a general formula $LiNi_{1/3}Co_{1/3}Mn_{1/3}O_2$ was used as the positive electrode active material, and in the preparation of the non-aqueous electrolyte solution of Example 5, the additive amount of the vinylene carbonate (VC) was changed to 1.0 wt % based on the weight of the non-aqueous electrolyte solution before admixing the lithium bis (oxalato)bolate $Li[B(C_2O_4)_2]$ thereto. Except for the above, the same procedure as that in Examples 1 and 5 was used to fabricate a lithium secondary battery of Example 10.

COMPARATIVE EXAMPLE 7

In Comparative Example 7, in the preparation of the positive electrode of Example 1, the lithium-nickel-cobalt-manganese composite oxide having the layer structure represented by the general formula $LiNi_{1/3}Co_{1/3}Mn_{1/3}O_2$ was used as the positive electrode active material in the same way as Example 10, and in the preparation of the non-aqueous electrolyte solution of Example 5, the lithium bis(oxalato)bolate $Li[B(C_2O_4)_2]$ was not admixed. Except for the above, the same procedure as that in Examples 1 and 5 was used to fabricate a lithium secondary battery of Comparative Example 7.

Each of the lithium secondary batteries of Examples 5 to 10 and Comparative Examples 4 to 7 thus fabricated was charged at the charging current of 1.4 A to the voltage of 4.2 V, and was further charged at the charging current of 0.07 A while the charging current was decreased keeping the voltage of 4.2 V, and then was discharged at a discharging current of 0.47 A to the voltage of 3.0 V under the room temperature of 25° C. so as to measure the discharge capacity Qo before the storage.

Then, under the room temperature of 25° C., each of the lithium secondary batteries of Examples 5 to 10 and Comparative Examples 4 to 7 was charged at the charging current of 1.4 A until the state of charge (SOC) became 50%, was charged and discharged at the currents of 0.24 A, 0.70 A, 2.4 A and 4.2 A respectively for ten seconds, thus, each of the battery voltages were measured. Each of the charging currents and the battery voltages measured as above were plotted to find the straight line showing the I-V characteristics at the charge time and the discharge time, and the IV resistance (mΩ) at the charge time and the discharge time before the storage was found based on the slop of the found straight line.

Then, each of the lithium secondary batteries of Examples 5 to 10 and Comparative Examples 4 to 7 was charged at the charging current of 1.4 A until the state of charge (SOC) became 50% under the room temperature of 25° C., and was stored in the homeothermal container in which the temperature was 65° C. for 30 days.

After being stored in the homeothermal container in which the temperature was 65° C. for 30 days, each of the lithium secondary batteries was taken out the container so as to measure the discharge capacity $Q_{30}$ after the storage for 30 days and the IV resistance (mΩ) at the charge time and the discharge time after the storage for 30 days as mentioned above.

Next, the percentage of the capacity recovery ratio (%) in each of the lithium secondary batteries was found based on the discharge capacity Qo before storage and the discharge capacity $Q_{30}$ after the storage for 30 days by way of the above formula. In addition, the increment of the IV resistance (mΩ) at the charge time and the discharge time after the storage for 30 days was found based on the IV resistance (mΩ) at the charge time and the discharge time before the storage and the IV resistance (mΩ) at the charge time and the discharge time after the storage for 30 days. The results were shown in the following Table 3.

TABLE 3

| | positive electrode active material | LiPF$_6$ (mol/l) | Li[B(C$_2$O$_4$)$_2$] (mol/l) | VC (wt %) | capacity recovery ratio (%) | increment of IV resistance (mΩ) at charge time | at discharge time |
|---|---|---|---|---|---|---|---|
| | | | | | after storage for 30 days at 65° C. | | |
| Example 5 | Li$_{1.1}$Mn$_{1.9}$O$_4$ / LiNi$_{0.4}$Co$_{0.3}$Mn$_{0.3}$O$_2$ | 1.0 | 0.05 | 2 | 89.8 | −0.3 | 2.1 |
| Example 6 | Li$_{1.1}$Mn$_{1.9}$O$_4$ / LiNi$_{0.4}$Co$_{0.3}$Mn$_{0.3}$O$_2$ | 1.0 | 0.10 | 2 | 89.9 | 2.6 | 4.2 |
| Example 7 | Li$_{1.1}$Mn$_{1.9}$O$_4$ / LiNi$_{0.4}$Co$_{0.3}$Mn$_{0.3}$O$_2$ | 1.0 | 0.05 | 0 | 84.0 | 4.9 | 7.7 |
| Example 8 | Li$_{1.1}$Mn$_{1.9}$O$_4$ / LiNi$_{0.4}$Co$_{0.3}$Mn$_{0.3}$O$_2$ | 1.0 | 0.10 | 0 | 85.0 | 3.3 | 6.2 |
| Comparative Example 4 | Li$_{1.1}$Mn$_{1.9}$O$_4$ / LiNi$_{0.4}$Co$_{0.3}$Mn$_{0.3}$O$_2$ | 1.0 | 0 | 2 | 89.6 | 5.3 | 6.2 |
| Comparative Example 5 | Li$_{1.1}$Mn$_{1.9}$O$_4$ / LiNi$_{0.4}$Co$_{0.3}$Mn$_{0.3}$O$_2$ | 1.0 | 0 | 0 | 82.0 | 13.6 | 15.9 |
| Example 9 | LiCoO$_2$ | 1.0 | 0.05 | 1 | 81.2 | 1.4 | 2.9 |
| Comparative Example 6 | LiCoO$_2$ | 1.0 | 0 | 1 | 78.7 | 6.2 | 11.5 |
| Example 10 | LiNi$_{1/3}$Co$_{1/3}$Mn$_{1/3}$O$_2$ | 1.0 | 0.05 | 1 | 83.3 | −0.5 | −0.2 |
| Comparative Example 7 | LiNi$_{1/3}$Co$_{1/3}$Mn$_{1/3}$O$_2$ | 1.0 | 0 | 1 | 81.4 | 0.2 | 1.1 |

As shown in the results, according to a comparison among the lithium secondary batteries of Examples 5 to 10 and Comparative Examples 4 to 7 using the same positive electrode active materials, the lithium second batteries of Examples 5, 6, 9 and 10 using the non-aqueous electrolyte solution admixed with the lithium bis(oxalato)bolate which is the lithium salt having the oxalato complex as the anion and the vinylene carbonate presented a higher capacity recovery ratio after the storage under the high temperature conditions and further suppressed the increment of the IV resistance at the charge time and the discharge time after the storage for 30 days under the high temperature conditions, as compared with the lithium secondary batteries of Examples 7 and 8 using the non-aqueous electrolyte solution wherein the vinylene carbonate was not admixed and the lithium secondary batteries of Comparative Examples 4 to 7 using the non-aqueous electrolyte solution wherein the lithium bis (oxalato) bolate which is the lithium salt having the oxalato complex as the anion was not admixed.

According to a comparison among the lithium secondary batteries of Examples 5 to 10, the lithium secondary batteries of Examples 5 to 8 using the mixture of the lithium-manganese composite oxide having the spinel structure and the lithium-nickel-cobalt-manganese composite oxide having the layer structure as the positive electrode active material presented a higher capacity recovery ratio after the storage under the high temperature conditions, as compared with the lithium secondary battery of Example 9 using $LiCoO_2$ as the positive electrode active material and the lithium secondary battery of Example 10 using only the lithium-nickel-cobalt-manganese composite oxide having the layer structure represented by the general formula $LiNi_{1/3}Co_{1/3}Mn_{1/3}O_2$ as the positive electrode active material.

According to a comparison among the lithium secondary batteries of Examples 5 to 10 and Comparative Examples 4 and 5 using the mixture of the lithium-manganese composite oxide having the spinel structure and the lithium-nickel-cobalt-manganese composite oxide having the layer structure as the positive electrode active material, the lithium secondary batteries of Examples 5 and 6 using the non-aqueous electrolyte solution admixed with the lithium bis(oxalato)bolate which is the lithium salt having the oxalato complex as the anion and the vinylene carbonate presented a higher capacity recovery ratio after the storage under the high temperature conditions and further suppressed the increment of the IV resistance at the charge time and the discharge time after the storage under the high temperature conditions.

Further, the lithium secondary batteries of Examples 7 and 8 using the non-aqueous electrolyte solution admixed with only the lithium bis(oxalato)bolate and the vinylene carbonate was not admixed thereto presented a higher capacity recovery ratio after the storage under the high temperature conditions and further suppressed the increment of IV resistance at the charge time and the discharge time after the storage under the high temperature conditions, as compared with the lithium secondary battery of Comparative Example 5 using the non-aqueous electrolyte solution wherein neither the lithium bis(oxalato)bolate which is the lithium salt having the oxalato complex as the anion nor the vinylene carbonate was admixed. Moreover, the lithium secondary batteries of Examples 7 and 8 further suppressed the increment of the IV resistance at the charge time after the storage under the high temperature conditions, as compared with the lithium secondary battery of Comparative Example 4 using the non-aqueous electrolyte solution admixed with only the vinylene carbonate and the lithium bis(oxalato)bolate which is the lithium salt having the oxalato complex as anion was not admixed thereto.

The present Example used the vinylene carbonate as the film forming agent to be admixed to the non-aqueous electrolyte solution, however, using vinyl ethylene carbonate, ethylene sulfite, or fluoroethylene carbonate makes it possible to form the second film in the same way as the vinylene carbonate, and roughly the same results may be attained.

Although the present invention has been fully described by way of examples, it is to be noted that various changes and modification will be apparent to those skilled in the art.

Therefore, unless otherwise such changes and modifications depart from the scope of the present invention, they should be constructed as being included therein.

What is claimed is:

1. A lithium secondary battery provided with a positive electrode, a negative electrode, and a non-aqueous electrolyte prepared by dissolving a solute in a non-aqueous solvent, wherein
    a positive electrode active material of said positive electrode is composed of lithium-manganese composite oxide having a spinel structure and lithium-transition metal composite oxide having a layer structure containing at least nickel, and
    lithium salt having an oxalato complex as anion and vinylene carbonate are admixed to said non-aqueous electrolyte, wherein
    said vinylene carbonate is admixed to the non-aqueous electrolyte in a range of 0.5 to 3.0 wt % based on the non-aqueous electrolyte before admixing the lithium salt having the oxalato complex as the anion thereto.

2. The lithium secondary battery according to claim 1, wherein
    said lithium salt having the oxalato complex as the anion to be admixed to the non-aqueous electrolyte is lithium bis(oxalato) borate $Li[B(C_2O_4)_2]$.

3. The lithium secondary battery according to claim 1, wherein
    the lithium salt having the oxalato complex as the anion is admixed to the non-aqueous electrolyte in a range of 0.01 to 0.1 mol/l based on said non-aqueous solvent in the non-aqueous electrolyte.

4. The lithium secondary battery according to claim 1, wherein
    said lithium-transition metal composite oxide having the layer structure containing at least nickel used as the positive electrode active material contains manganese.

5. The lithium secondary battery according to claim 1, wherein
    said solute in the non-aqueous electrolyte is $LiPF_6$.

6. A lithium secondary battery provided with a positive electrode, a negative electrode, and a non-aqueous electrolyte prepared by dissolving a solute in a non-aqueous solvent, wherein
    lithium salt having an oxalato complex as anion and vinylene carbonate is admixed to said non-aqueous electrolyte.

7. The lithium secondary battery according to claim 6, wherein
    said lithium salt having the oxalato complex as the anion to be admixed to non-aqueous electrolyte is lithium bis (oxalato) borate $Li[B(C_2O_4)_2]$.

8. The lithium secondary battery according to claim 6, wherein the lithium salt having the oxalato complex as the anion is admixed to the non-aqueous electrolyte in a range of 0.01 to 0.1 mol/l based on said non-aqueous solvent in the non-aqueous electrolyte.

9. The lithium secondary battery according to claim 6, wherein at least one of lithium-manganese composite oxide having a spinel structure and lithium-transition metal composite oxide having a layer structure containing at least nickel is used as said positive electrode active material of the positive electrode.

10. The lithium secondary battery according to claim 6, wherein said solute in the non-aqueous electrolyte is $LiPF_6$.

* * * * *